Patented June 9, 1936

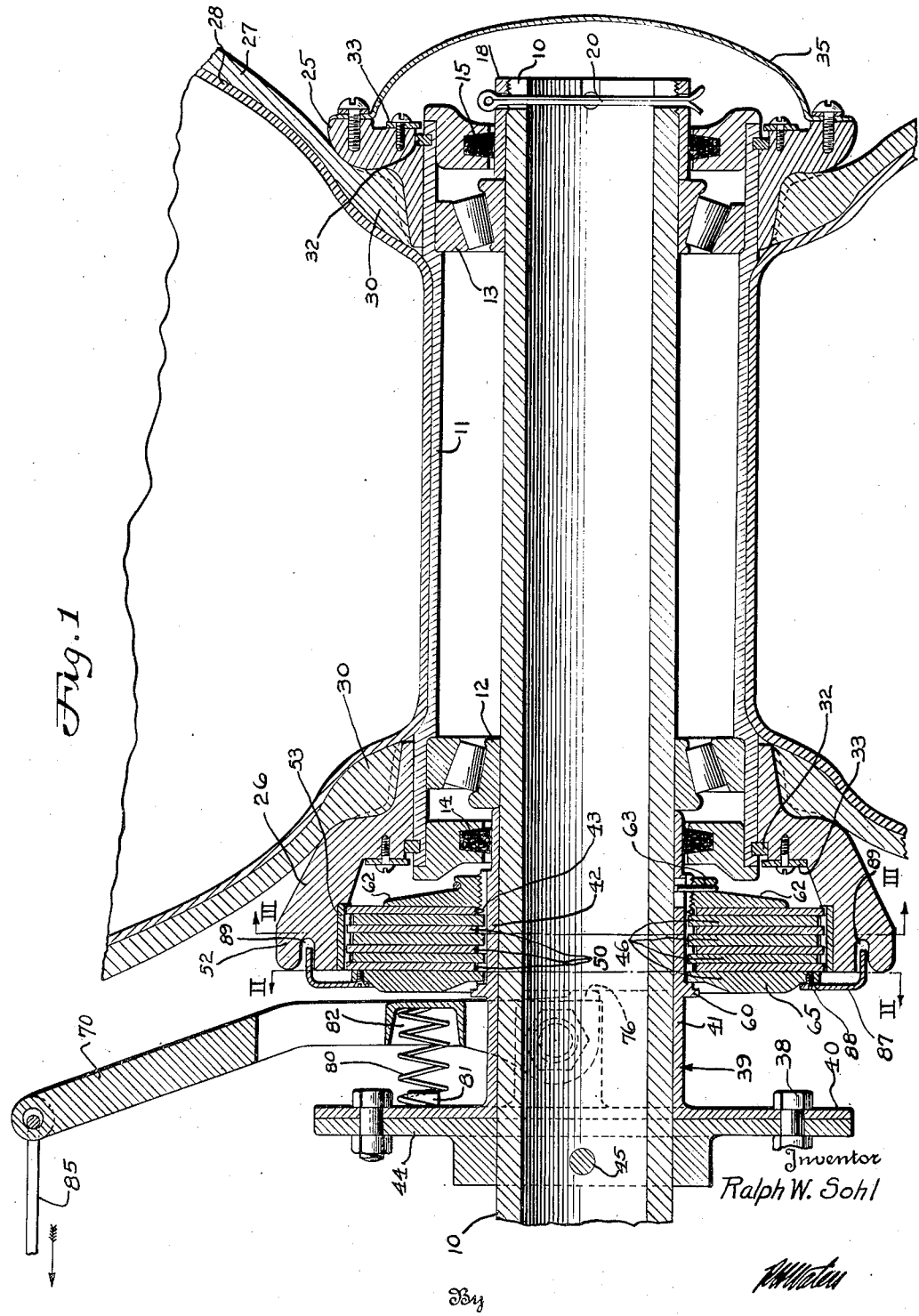

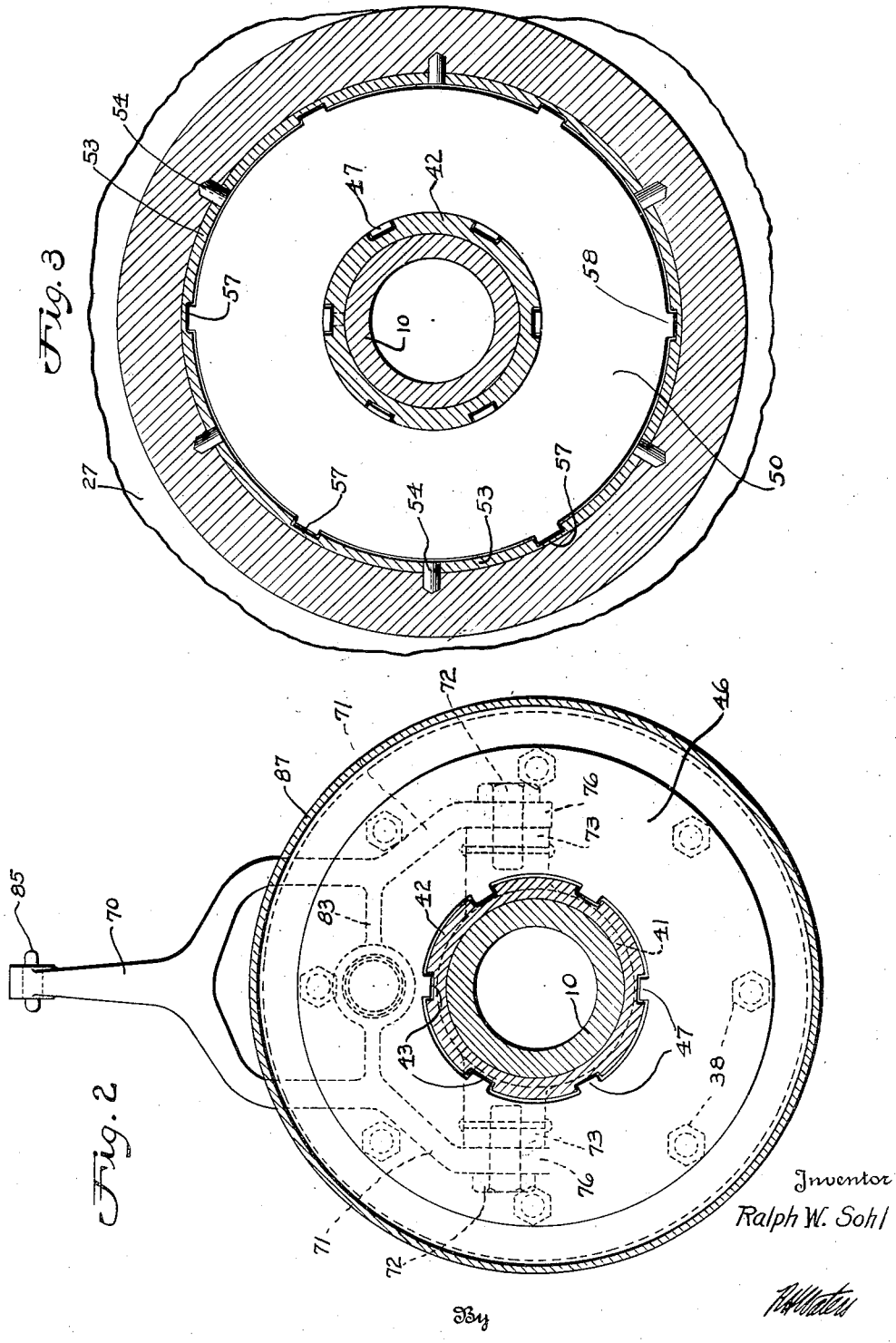

2,043,933

UNITED STATES PATENT OFFICE 2,043,933

BRAKE

Ralph W. Sohl, Akron, Ohio, assignor, by mesne assignments, to Wingfoot Corporation, Wilmington, Del., a corporation of Delaware Application April 29, 1932, Serial No. 608,232

13 Claims. (Cl. 188—18)

This invention relates to a brake and more particularly to a disc brake adapted to be used in conjunction with a large cushion or super-balloon tire of the type adapted to fit directly upon a hub rotatably mounted upon a fixed axle.

It is an object of the present invention to provide an improved brake for operation between a rotatable hub and a fixed axle.

Another object of the invention is to provide a simple, efficient, long-wearing and easily operated brake structure.

Another object of the invention is to provide a brake for a tire mounted directly upon a rotatable hub.

Another object of the invention is to provide a brake for a rotatable hub, wherein the brake is positioned at the side of the hub where it is cooled by radiation and by the flow of air over the braking surfaces, without any heat damage to a tire or tube mounted on the hub.

Another object of the invention is to provide a disc brake for an airplane wheel mounting a super-balloon tire, which brake is light in weight, positive in action, and long-wearing in use.

Another object of the invention is to provide a disc brake having the characteristics set forth above wherein simple and easily adjustable means are provided for taking up any wear in the brake.

Another object of the invention is to provide a disc brake for an airplane wheel assembly including a super-balloon tire, wherein the brake assembly is positioned at the side of the hub where any heat generated thereby can be dissipated without injury to the super-balloon tire or the tube inflating the tire.

The foregoing and other objects of the invention are achieved by the mechanism described hereafter and illustrated in the accompanying drawings, wherein:

Fig. 1 is a vertical, longitudinal sectional view illustrating one form of brake embodying the present invention;

Fig. 2 is a cross-sectional view taken on line II—II of Fig. 1, particularly serving to illustrate the means for actuating the brake mechanism; and Fig. 3 is a cross-sectional view similar to Fig. 2 but taken on line III—III of Fig. 1.

Referring to the drawings, the numeral 10 indicates a non-rotative, hollow shaft, on which is journaled a rotatable cylindrical hub 11 through the agency of roller bearings 12 and 13. Lubricant retaining, gasket rings 14 and 15 may be provided in the usual manner. The end of the hollow shaft 10 is threaded to receive a hub retaining collar 18 and the collar and the end of the shaft 10 are castled to receive a collar locking cotter pin 20.

Mounted upon the cylindrical hub 11 are tire retaining flanges 25 and 26 which serve to mount a super-balloon tire 27 inflated by an inner tube 28. Interlocking ribs and grooves, indicated generally at 30, on the tire retaining flanges 25 and 26 and the beads of the tire 27 serve to prevent relative movement by the tire and hub.

The tire retaining flanges 25 and 26 are releasably fixed to the cylindrical hub 11, which may be accomplished through the agency of locking rings 32 and ring retaining plates 33. A cover 35 may be secured over the end of the hub assembly to give an improved appearance thereto if desired.

Now referring to the brake mechanism with which the present invention is more directly concerned, the numeral 39 indicates generally an anchor bracket having a cylindrical portion 41 fitting directly over the hollow shaft 10 and a flange portion 40 which is secured by bolts 38 to a flange 44 fixed to the shaft 10 by any suitable means such as screws 45. The cylindrical portion 41 of the anchor bracket 39 is provided with an enlarged middle portion 42 which is formed with a plurality of longitudinally extending keyways 43, as best seen in Fig. 2.

Mounted on the enlarged portion 42 of the anchor bracket 39 are a plurality of braking discs 46. These of course can be any number depending upon the use that the brake gets and upon the load that the brake must carry. It will be seen from the drawings that the braking discs 46 are provided with a plurality of radially inwardly directed lugs 47 which are received in the longitudinally extending keyways 43 of the anchor bracket 39. The braking discs thus can have relative longitudinal movement with respect to the anchor bracket 39, but cannot rotate relative thereto.

Positioned between the braking discs 46 are a plurality of cooperating braking plates 50 which are adapted to be rotated by the hub 11. This is preferably accomplished by providing the tire retaining flange 26 with an extension 52 which receives a cylindrical ring 53 secured thereto by suitable means such as pins 54. The cylindrical ring 53 is provided with a plurality of circumferentially spaced, longitudinally extending grooves 57 which cooperate with radially outwardly extending lugs 58 upon the plates 50 to allow the plates 50 to have relative longitudinal movement with respect to the cylindrical ring 53 and the extension 52 on the tire retaining flange 26, but which prevent relative rotary movement between the plates and the tire retaining flange and thus the hub 11.

The enlarged portion 42 of the anchor bracket 39 is provided with a cylindrical flange 60 which retains the interposed discs 46 and plates 50 from movement in one direction, and an adjusting and retaining nut 62 serves in the same capacity at the other side of the discs and plates. The adjusting and retaining nut 62 is screwed on the threaded end of the enlarged portion 42 of the anchor bracket 39. Suitable means, such as a spring wire retaining lock 63, may be provided to positively fix the adjusting and retaining nut 62 in the desired position.

The outside braking disc indicated by the numeral 65 is somewhat heavier so that it can serve as a pressure disc to apply the force from the brake actuating means to the interposed plates and discs. The brake actuating means may take the form of a lever 70 having bifurcated legs 71 which are pivotally secured by cap screws 72 to raised bosses 73 on the anchor bracket 39. The ends of the legs 71 of the lever 70 are provided with axially directed, cam like surfaces 76, best seen in Fig. 1, which contact with diametrically opposed portions of the enlarged end pressure disc 65. The cam surfaces 76 are designed to effect an endwise axial thrust on the cooperating discs and plates upon movement of the actuating lever 70.

Means are provided to normally hold the actuating lever 70 in an inoperative position, which means may take the form of a compression spring 80 carried between a raised boss 81 on the flange 42 and a socket 82 formed in a saddle 83 spanning the legs 71. Means, such as a cable 85, secured to the end of the actuating lever 70, are ordinarily provided to allow the brake to be actuated from any remote position such as the cockpit of an airplane.

In order to protect the brake from water, sand, or other foreign material, a guard 87 is preferably secured to the enlarged end pressure disc 65 as by screws 88, which plate may be provided with an axially extending flange received in a groove 89 formed in the enlarged portion 52 of the tire retaining flange 26.

It is believed that the operation of the brake will be completely apparent from the foregoing detailed description. However, a brief résumé thereof follows:

As will be evident from the drawings, the braking plates 50 positioned between the braking discs 46 are adapted to be rotated with the hub 11 and the tire 27, inasmuch as these braking plates are feathered to the enlarged portion 52 of the tire retaining flange 26 mounted directly on the hub 11. On the other hand, the braking discs 46 are held against rotation by being feathered to the anchor bracket 39 and thus to the hollow fixed shaft 10 because of the cooperating lugs 47 and keyways 43. Thus when the tire 27 and hub 11 rotates the plates 50 will be rotated thereby and the braking discs 46 will be fixed. There is sufficient clearance between the braking plates 50 and the braking discs 46 so that no braking action will be exerted unless the brake actuating lever 70 is moved.

However, when it is desired to effect a braking action upon the rotating tire 27 and hub 11 the actuating lever 70 is moved in the direction of the arrow by the cable 85 against the action of compression spring 80, which movement causes the cam portion 76 on the lever legs 71 to cause an axial movement inwardly of the end pressure braking disc 65. The feathered connections between the braking discs 46 and the anchoring bracket 39 and the feathered connections between the braking plates 50 and the enlarged portion 52 of the tire retaining flange 26, will cause the pressure on the end braking disc 65 to exert a uniform pressure between all contacting surfaces of the braking discs and plates. A very positive and effective braking action is thus produced between the fixed shaft 10 and the rotating cylindrical hub 11 carrying the tire 27.

The adjusting and retaining nut 62 permits the effectiveness of the brake to be retained even after considerable wear of the braking parts, in that this nut can be adjusted to bring the interposed braking discs and plates into the proper relation after wear. The retaining nut 62 also serves as an initial adjustment to insure that there will be no drag of the brake when the actuating lever is in the inoperative position.

It will be understood that various materials can be used for either the braking plates or the braking discs. In certain instances the discs or plates can take the form of a metal plate provided with a face of fibrous braking material. Again, the braking discs can be made of one material and the braking plates of another. The superimposed plates and discs can be run dry or with a lubricant, as desired.

From the foregoing it will be seen that the present invention provides a brake built up of a comparatively small number of parts. The brake assembly is simple and positive in operation and means are provided to readily take up wear of the braking elements. The brake can be applied to various wheel assemblies with little or no modification of the usual wheel assembly. There is no complex operating mechanism nor are there wearing parts other than the braking elements.

The brake comprising the present invention is positioned at one side of the hub where the heat generated in the brake can be readily dissipated by radiation and by the cooling action of air flowing over the brake. There is no chance for the heat from the brake to seriously affect the life of a tire and particularly a tire inflating tube mounted directly upon the hub.

While the brake mechanism comprising the present invention has been particularly illustrated and described in conjunction with a wheel assembly adapted to mount a super-balloon tire directly upon a hub, such as is the practice in airplane wheel assemblies, it should be understood that this form of the invention has been selected merely by way of illustration and that the invention contemplates application of the braking mechanism to wheel assemblies of substantially all types and designs. Again, the brake mechanism is adapted for use wherever it is desired to effect a braking action between relatively rotatable members.

It will accordingly be appreciated that the present invention is not limited to the details of construction shown in the accompanying drawings and described herein, and that the invention is intended to broadly cover all features of patentable novelty contained therein as defined in the appended claims.

What I claim is:

1. In combination, a fixed axle, a hub journaled on the axle, a tire mounted directly on the hub, an anchor bracket fixed to the axle at one side of the hub, a plurality of braking discs surrounding the anchor bracket and having axial but non-rotative movement thereon, a laterally extending circular flange on the hub, a plurality of braking plates carried by, but internally of, the hub flange and having axial but non-rotative movement with respect to said hub, said braking plates and discs being interposed with respect to each other, an adjustably fixed abutment at one end of the interposed plates and discs and carried by said anchor bracket, and means at the other end of the interposed plates and discs for clamping the same together, said means including a lever pivoted on the anchor bracket and having a cam surface contacting with the interposed plates and discs.

2. In combination, a fixed axle, a hub journaled on the axle, tire retaining flanges on the hub, a tire mounted directly on the hub and positioned by the retaining flanges, an anchor bracket fixed to the axle at one side of the hub, a plurality of braking discs having axial but non-rotative movement on the anchor bracket, a plurality of braking plates carried by a tire retaining flange on the hub and having axial but non-rotative movement with respect thereto, said braking plates and discs being interposed with respect to each other, an adjustably fixed abutment at one end of the interposed plates and discs, and means at the other end of the interposed plates and discs for clamping the same together.

3. In combination, a fixed axle, a hub journaled on the axle, an anchor bracket fixed to the axle at one side of the hub, a plurality of braking discs surrounding the anchor bracket and having axial but non-rotative movement thereon, a laterally extending circular flange on the hub, a plurality of braking plates carried by, but internally of, the hub flange and having axial but non-rotative movement with respect to said hub, said braking plates and discs being interposed with respect to each other, an adjustably fixed abutment at one end of the interposed plates and discs and carried by said anchor bracket, and means at the other end of the interposed plates and discs for clamping the same together.

4. In combination, a fixed axle, a hub journaled thereon, tire retaining flanges removably mounted on the hub, a plurality of cooperating braking discs, certain of said discs being mounted on the axle for axial movement, certain other of the braking discs being feathered to one of the tire retaining flanges, means at one side of the cooperating discs controlling the initial pressure thereon and providing a takeup for wear and means at the other side of the discs for clamping the discs together to provide a braking action, said last named means including a lever pivoted transversely of the axle and having a cam portion contacting with the cooperating discs.

5. In combination, a fixed axle, a hub journaled thereon, tire retaining flanges removably mounted on the hub, a plurality of cooperating braking discs, certain of said discs being mounted on the axle for axial movement, certain other of the braking discs being feathered to one of the tire retaining flanges, means at one side of the cooperating discs controlling the initial pressure thereon and providing a takeup for wear and means at the other side of the discs for clamping the discs together to provide a braking action, said last named means including a lever having a cam portion contacting with the cooperating discs.

6. In combination, a fixed axle, a hub journaled thereon, tire retaining flanges removably mounted on the hub, a plurality of cooperating braking discs, certain of said discs being mounted on the axle for axial movement, certain other of the braking discs being feathered to one of the tire retaining flanges, means at one side of the cooperating discs controlling the initial pressure thereon and providing a takeup for wear and means at the other side of the discs for clamping the discs together to provide a braking action.

7. In combination, a fixed axle, a hub journaled thereon, a plurality of cooperating braking discs, certain of said discs being mounted on the axle for axial movement only, certain other of the braking discs being mounted for rotation with the hub and for axial movement, means at one side of the cooperating discs controlling the initial pressure thereon and providing a takeup for wear and means at the other side of the discs for clamping the discs together to provide a braking action, said last named means including a lever pivoted transversely of the axle and having a cam portion contacting with the cooperating discs, the curvature of the cam providing the wedging braking action upon movement of the lever.

8. Braking mechanism for use in conjunction with a fixed axle and a rotatable hub adapted to directly support a super-balloon tire, comprising a plurality of interposed braking discs mounted at one side of the hub, certain of the discs being mounted for rotation with the hub and for axial movement, and the remaining discs being mounted on the axle for axial movement only, an adjustably fixed abutment on the axle between the discs and the hub, a bifurcated lever straddling and pivotally secured to the axle and having cam surfaces contacting at approximately diametrically opposite points on the interposed discs, the cam curvature providing the wedging action upon rotation of the lever, and a cover plate fixed to the disc remote from the hub and having a portion extending into an annular slot on the hub.

9. Braking mechanism for use in conjunction with a fixed axle and a rotatable hub adapted to directly support a super-balloon tire, comprising a plurality of interposed braking discs mounted at one side of the hub, certain of the discs being mounted for rotation with the hub and for axial movement, and the remaining discs being mounted on the axle for axial movement only, an adjustably fixed abutment on the axle between the disc and the hub, a bifurcated lever straddling and pivotally secured to the axle and having cam surfaces contacting at approximately diametrically opposite points on the interposed discs, and a cover plate fixed to the disc remote from the hub and having a portion extending into an annular slot on the hub.

10. Braking mechanism for use in conjunction with a fixed axle and a rotatable hub adapted to directly support a super-balloon tire, comprising a plurality of interposed braking discs mounted at one side of the hub, certain of the discs being mounted for rotation with the hub and for axial movement, and the remaining discs being mounted on the axle for axial movement only, an adjustably fixed abutment on the axle between the discs and the hub, a bifurcated lever straddling and pivotally secured to the axle and having cam surfaces contacting the interposed discs.

11. Braking mechanism for use in conjunction with a fixed axle and a rotatable hub adapted to directly support a super-balloon tire, comprising a plurality of interposed braking discs mounted at one side of the hub, certain of the discs being mounted for rotation with the hub and for axial movement, and the remaining discs being mounted on the axle for axial movement only, and an adjustably fixed abutment on the axle between the discs and the hub.

12. Braking mechanism for use in conjunction with a fixed axle and a rotatable hub comprising a plurality of interposed braking discs mounted at one side of the hub, certain of the discs being mounted for rotation with the hub and for axial movement, and the remaining discs being mounted on the axle for axial movement only, an adjustably fixed abutment on the axle between the discs and the hub, a bifurcated lever straddling and secured to the axle on a pivot extending transversely thereof and having cam surfaces contacting at approximately diametrically opposite points on the interposed discs.

13. Braking mechanism for use in conjunction with a fixed axle and a rotatable hub comprising a plurality of interposed braking discs mounted at one side of the hub, certain of the discs being mounted for rotation with the hub and for axial movement, and the remaining discs being mounted on the axle for axial movement only, an abutment on the axle between the discs and the hub, a bifurcated lever straddling and pivotally secured to the axle and having cam surfaces contacting the interposed discs and a cover plate fixed to the disc remote from the hub and having a portion extending into an annular slot on the hub.

RALPH W. SOHL.